April 25, 1939.   C. M. ROAN ET AL   2,155,617
DIRECTION TURN INDICATOR FOR VEHICLES
Filed Jan. 29, 1936   3 Sheets-Sheet 1
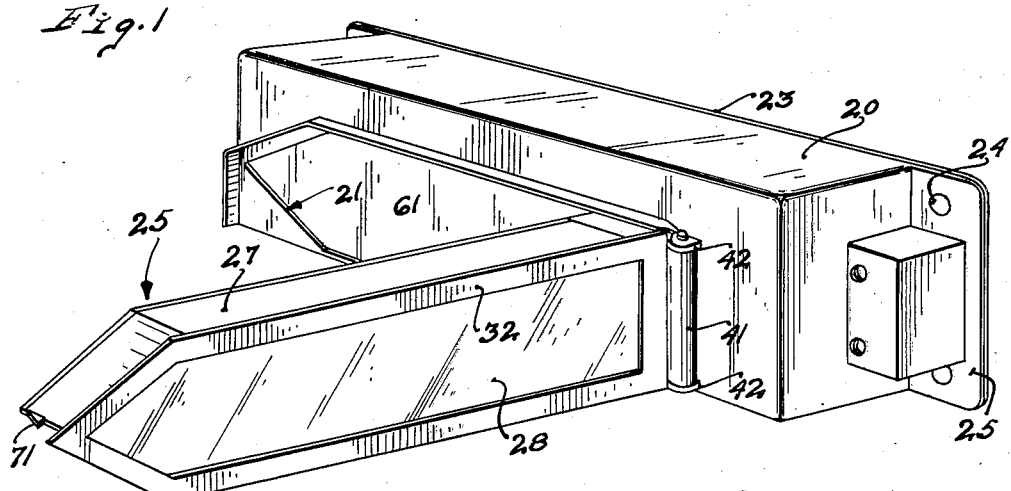
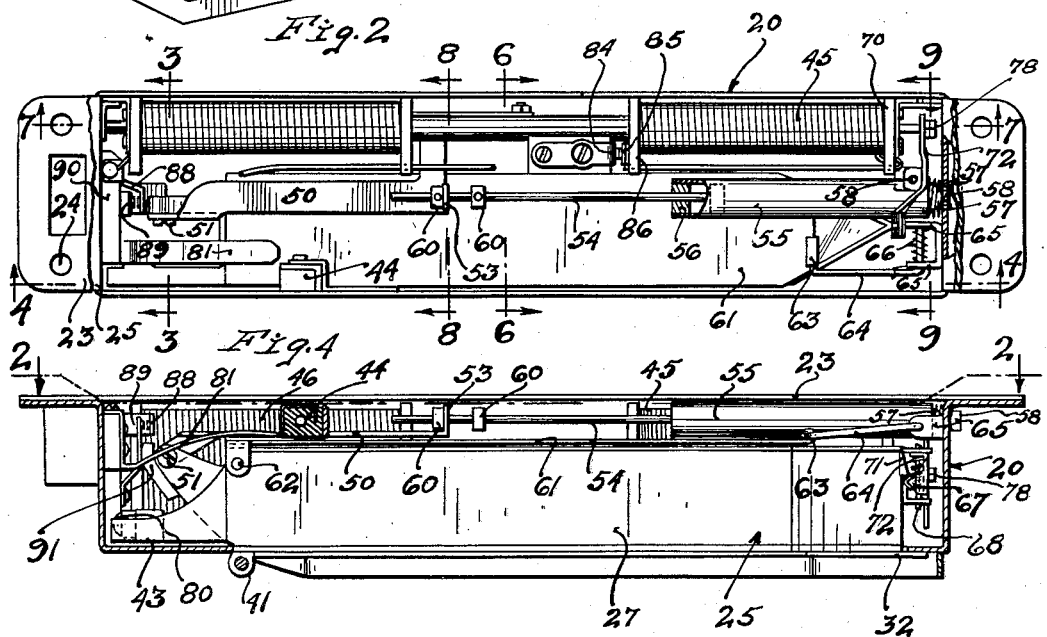
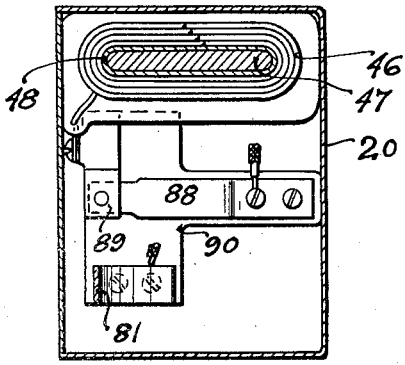
Inventors
Carl M. Roan
Oliver E. Kaupang
Arthur W. Rohlen
By their Attorneys April 25, 1939.  C. M. ROAN ET AL  2,155,617
DIRECTION TURN INDICATOR FOR VEHICLES
Filed Jan. 29, 1936  3 Sheets-Sheet 2
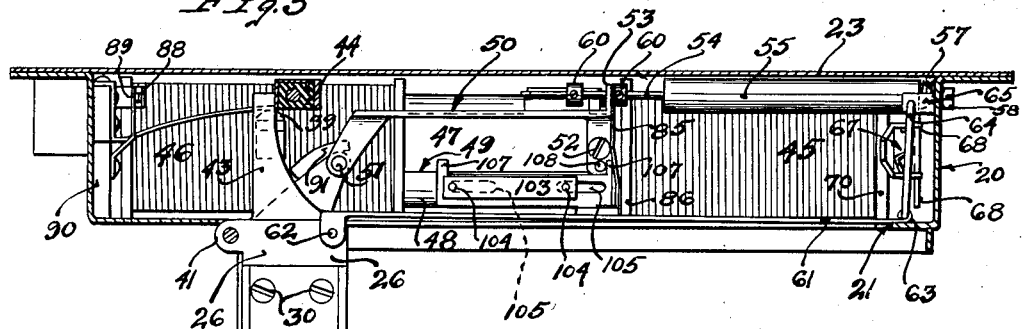
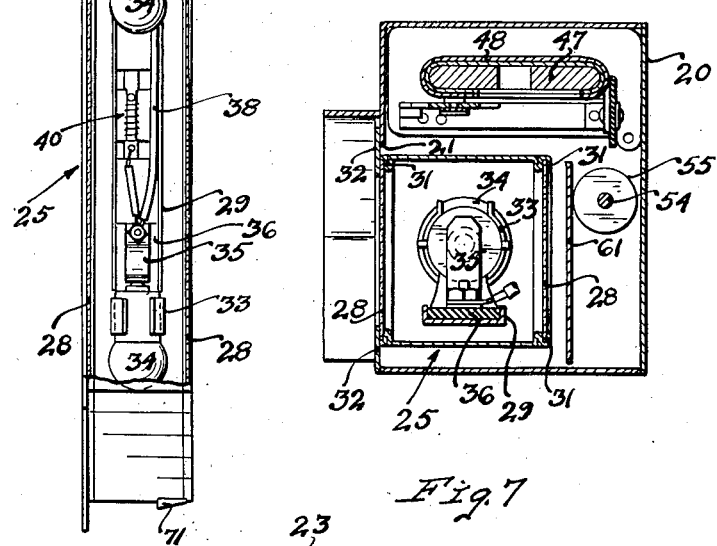
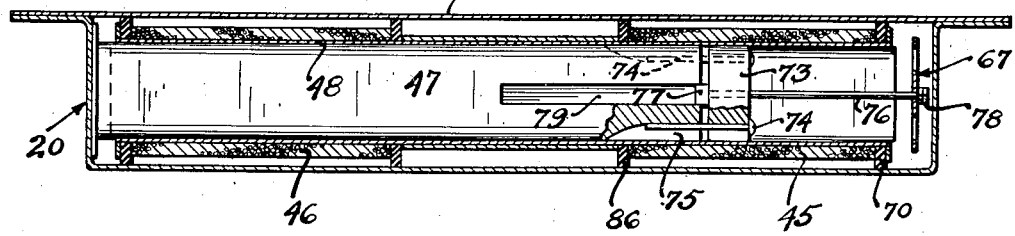
Inventors
Carl M. Roan
Oliver E. Kaupang
Arthur W. Rohlen
By their Attorneys April 25, 1939.　　C. M. ROAN ET AL　　2,155,617
DIRECTION TURN INDICATOR FOR VEHICLES
Filed Jan. 29, 1936　　3 Sheets-Sheet 3

Inventors
Carl M. Roan
Oliver E. Kaupang
Arthur W. Rohlen
By their Attorneys
Merchant & Kilane Patented Apr. 25, 1939

2,155,617

UNITED STATES PATENT OFFICE 2,155,617

DIRECTION TURN INDICATOR FOR VEHICLES

Carl M. Roan, Oliver E. Kaupang, and Arthur W. Rohlen, Minneapolis, Minn., assignors to Beacon Safety Signal Co.

Application January 29, 1936, Serial No. 61,300

7 Claims. (Cl. 177—329)

The present invention relates to direction turn indicators for automobiles, busses, and the like, and generally stated, consists of novel devices, combinations of devices and arrangement of parts hereinafter described and assigned in the claims.

The invention is in the nature of an improvement on or modification of the direction turn indicator described and claimed in our co-pending application, Serial No. 745,746, which was filed September 27, 1924, and entitled "Direction turn indicator for vehicles".

A particularly important object of the present invention is the provision of a direction turn indicator, of the type which includes a casing, a signal arm projectable from and retractable into the casing and manually controllable means for projecting and retracting a signal arm, of improved means for normally locking or latching the signal arm against projecting movements. A more specific object of the present invention is to provide latching or locking mechanism of the type described which will lock the signal arm against accidental projection under ordinary conditions of jarring and jolting, but which will yield to excessive pressure so as to greatly reduce the possibility of the signal arm becoming stuck against intended and controlled projecting pressure, and to provide in further combination with such latch mechanisms means for automatically retracting the signal arm to normal position if and when it should be accidentally projected through excessive jolting or jarring.

The above and other highly important objects of the advantages of the invention will be made apparent from the specification and claims and in the accompanying drawings wherein like characters indicate like parts throughout the several views.

Referring to the drawings:

Fig. 1 is a perspective view of a complete indicating device, with the signal arm in extended or projected position.

Fig. 2 is a view looking from back toward the front of the signal device shown in Fig. 1, with the rear cover plate broken away to expose the inner mechanism, said view being taken on the irregular line 2—2 of Fig. 4.

Fig. 3 is a transverse sectional view taken on a line 3—3 of Fig. 2.

Fig. 4 is a sectional view taken on the line 4—4 of Fig. 2.

Fig. 5 is a view similar to Figure 4, but showing the signal arm in projected position rather than in a retracted position as shown in Fig. 4.

Fig. 6 is a transverse sectional view taken on line 6—6 of Fig. 2.

Fig. 7 is a longitudinal sectional view taken on the line 7—7 of Fig. 2, some parts on the sectional line being shown in full and some of the parts being broken away and shown in section.

Figure 8:
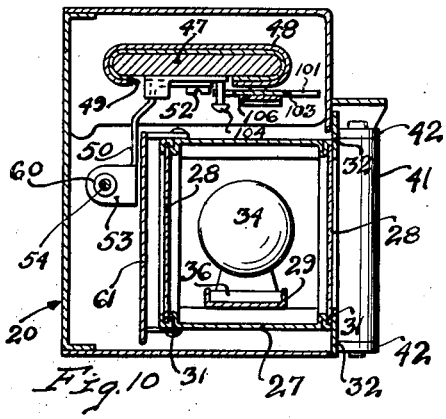
Fig. 8 is a transverse sectional view taken on the line 8—8 of Fig. 2.
Figure 9:
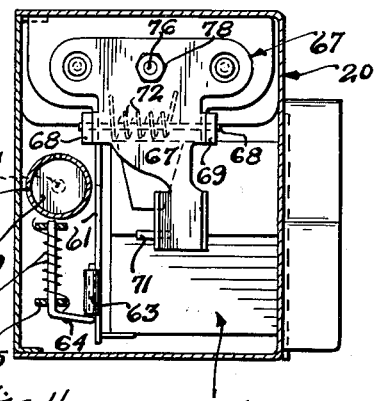
Fig. 9 is a transverse sectional view taken on the line 9—9 of Fig. 2.

The shell or box-like casing of the indicator is indicated as an entirety by a numeral 20. This casing 20 is preferably stamped or pressed from sheet metal and is provided in its front longitudinal face with a large opening 21, which opening 21 is shaped to correspond to the profile of the signal arm. The back of the casing 20 is normally closed by a cover plate 23 that is removably held in place by suitable anchoring screws or the like, not shown, that are passed through aligned apertures 24 in the covering plate 23, and in anchoring lugs or flanges 25 that are formed integrally with the ends of the casing 20. The casing of the device is adapted to be mounted in a suitable position on the side of a vehicle body by means of suitable anchoring screws passed through the aligned holes 24, to serve the dual function of anchoring the entire devices and retaining the back plate 23.

The signal arm, which is indicated as an entirety by 25, is very similar in character to that illustrated in our above referred-to companion application and comprises a heel block 26 that is preferably cast, a longitudinal U-shaped frame 27, translucent or transparent side-plates 28, and internal light bulb supporting bar 29 that may be assumed to be rigidly anchored to the heel block and its inner end.

The U-shaped frame 27 is secured to the heel block detachably by means of screws or the like, 30, applied through the inner ends of the U-shaped frames at points overlapping the heel block. The inner marginal edges of the frame 27 are formed or provided with channels 31 for reception of the marginal edge portions of the transparent or translucent side-plates 28, the plates 28 being inserted into the channels from the rear when the frame 27 is removed from the heel block. The outside channels 31 are completed by outwardly projecting flanges 32 that are suitably secured to the frame 28, preferably by welding or the like, not shown, and which flanges 32 overlap the outer face of the box-like house or casing 20, adjacent the signal arm opening 21. The plates 29 may, of course, be of any desired color, but preferably one of the said plates will be tinted yellow and the other red, the choice being such that the red plate will face rearwardly when the signal arm is projected and so that the yellow plate will be visible from the front of the vehicle when the arm is extended. In this respect, it may be said that the device when used as a left hand turn indicator is preferably applied, so that the free end of the signal arm points forward when the arm is retracted.

Located within the signal arm in suitable sockets 33 is a pair of light bulbs 34, which are supported by and grounded to the supporting bar 29. At this point, it may be stated that the base shell contact of each bulb 34 is grounded to the bar 29 through its respective socket, and through the medium of the sockets and bar 29 and base shell contacts of the bulb are grounded to the metallic parts of the associated vehicle.

The center rear contact of each of the light bulbs is yieldingly engaged by a spring contact 35, only one of which is shown, said spring contacts being anchored to the bar 29 through the medium of a suitable insulating strip 36. Spring contacts 35 are connected together through the medium of a lead 38 that connects to a contact head 39, which is carried by and insulated electrically from the heel block 26 at a point offset from the axis of the signal arm. The lead 38, at a point between the bulbs 34 and the contact head 39, has interposed therein a conventional thermo flasher switch 40.

For rigidly anchoring the signal arm 25 to the casing 20, the heel block of the signal arm is provided with an intricately formed offset hinge block 41 that works between and is pivoted to hinge lugs 42 that project from the front face of the casing 20. The heel block is provided with an intricately formed projecting stop lug 43 for engagement with a resilient stop block 44 at the time when the signal arm is fully projected at right angles to the casing. The resilient stop block 44 is suitably but rigidly anchored to the casing 20.

As a reversible motor for moving the signal arm to and from operative extended or projected position, we provide a double solenoid motor that is very similar in character to that of our above identified co-pending application. This motor is comprised mainly of longitudinally spaced flat solenoids 45 and 46, these solenoids being securely anchored to the casing above and out of alignment with the space normally occupied by the signal arm. Working longitudinally through the solenoids 45 and 46, which solenoids are axially aligned, is a magnetically influenceable armature 47 that is common to both solenoids. The solenoids 45 and 46 are wound on a common sleeve 48 of non-magnetical material, such as brass and copper, and the armature bar 47 works in the sleeve 48 and is guided for true axial movements thereby. At its undersurface, the sleeve 48 is provided with a wide slot 49 intermediate the solenoids 45 and 46.

The exposed intermediate portion of the armature 47 is connected to the heel block 26 at a point offset from the axis by means of a more or less L-shaped operating link or arm 50 that is pivotally connected to the heel block at 51 and to the armature by means of a screw or the like at 52. At its intermediate portion, the link 50 is formed with an outstanding lug 53 working through which, for limited axial sliding movements, is a piston equipped plunger rod 54 of a dash pot 55. The dash pot 55 is closed at one end by a plug-like head 56 that serves as a guide for the plunger rod 54, and at its outer or rear end the dash pot 55 is closed with a rounded heel-acting head end 57 that works against the end of the casing 20 and is loosely secured in respect thereto by means of a screw or the like 58 that works loosely in the end of the casing so as to permit limited rocking motion of the heel end of the dash pot in respect to the end of the casing. The piston of the rod 54 works within the dash pot and is indicated by 59. Free axial sliding movements of the plunger rod 54 through the lug 53 are limited by means of adjustable stops 60. The dash pot and associated connections just described cushion movements of the signalling arm when it approaches its extreme open or closed positions, and the stops 60 are so adjusted that the signal arm will move freely and unaffected by the dash pot during initial opening or closing movements.

This signal structure is provided with a shutter for closing the opening 21 of the casing when the signal arm is projected. This shutter is very similar to that described and claimed in our above referred to companion application, and is best illustrated in the present drawings in Figs. 1, 2, 4 and 5. This shutter, indicated as an entirety by 61, is formed of flat sheet metal and is located within the casing inward of the signal arm. At one end the shutter 61 is pivotally connected to the heel block at 62, (see particularly in Fig. 4) and at its other end the shutter is pivotally connected at 63 to a guide arm 64, which guide arm at its other end is pivotally connected to the casing 20 through the medium of rigid lugs 65.

The point of pivotal connection 62 of the shutter 61, is such in relation to the axis 41 of the signal arm, and the guide arm 64 is of such length that the shutter will be positioned flat against the inner face of the signal arm when the said signal arm is in its retracted position, as shown in Fig. 4, and when the signal arm is moved outwardly to its fully extended or projected position, the shutter will move against the inner inside of the outer wall of the casing 20 and close the signal arm aperture 21, as shown particularly in Figs. 1 and 5. The axial portion of the shutter guide arm 64 is provided between the pivot lugs 65 with a light coil spring 66 which is arranged to exert light outward pressure on the guide arm 64. This spring 66 serves, when the signal arm is in a retracted position, to keep the shutter close against the signal arm and the several parts of the shutter mechanism under sufficient pressure to prevent rattling thereof, and said spring serves, when the signal arm is projected, to keep the shutter tight against the front of the casing 20, so that the shutter will tightly close the aperture and prevent snow, sleet, rain, and other foreign elements, including dust, out of the casing when the signal arm is projected.

It will, of course, be obvious that when the signal arm is retracted, the signal arm and its marginal flange 32 tightly close the opening 21.

As an important feature to this invention, we provide means for mechanically securing the signal arm locked or latched in a retracted position, and although the latching mechanism herein provided for the purpose is similar in character to the latch mechanism of our co-pending application above referred to, there are important distinctions between the present and prior latch mechanisms which will be hereinafter made clear.

The latch proper is indicated by 67 and is intermediately pivoted at 68 to lugs 69 that are rigidly secured to and project from a fixed head 70 of the adjacent solenoid 45. The free end of the latch 67 is formed to afford a V-shaped tip, and the apex of this V-shaped tip faces toward the pointed free end of the signal arm and one side thereof normally engages the blunt end of a beveled latch lug 71 on the free end of the signal arm frame 27. The latch is subject to the yielding action of a spring 72 which yieldingly presses the latch against the latch lug 71 when the signal arm is in a fully retracted position and after the latch has cammed itself past the latch lug near the completion of its retracting movement. At this point, it is desirable to note that the present latch mechanism differs from the latch mechanism of my previously filed co-pending application identified above in that the latter latch, due to its cam-acting, V-shaped tip, maintains the signal arm when the latter is in a retracted position under close tension, whereas the latch of my previous application maintained no such closing tension on the signal arm in retracted position.

Furthermore, it is important to note that due to the camming action of the latch on the latch lug of the present application, the latch does not afford a positive lock as did the latch in my prior application and, therefore, no special means for manually releasing the latch mechanism in the present case is necessary, it being possible to force the signal arrow outward by manual pressure against the action of the latch mechanism. The spring 72 does, however, exert sufficient latching pressure on the latch to prevent accidental release of the signal under all ordinary encounter of jolting and jarring when a vehicle is in operation.

For automatically releasing the latch, the following described connections are employed. The armature 47 is provided, at its end portion adjacent the latch mechanism, with a tip 73 of magnetically influenceable material, and the armature tip is carried by the armature within the solenoid 45 for limited longitudinal sliding movements in respect to the armature by means of headed pins, or the like, 74. The pins 74 are inserted into slots 75 in the armature and thereafter the slots 75 are enclosed sufficiently to securely anchor the pins against accidental movement. Working through the armature tip 73 and through the adjacent end of the latch 67, is a trip-rod 76 that is provided at its inner end with a head 77 and at its outer end is equipped with screw-threaded nuts 78, which serve as a head. The head 77 of the trip-rod is engageable with the armature tip and is arranged to work in a longitudinal slot 79 in the armature. The manner of operation of the latch actuates the construction above described and will be apparent from the description of the operation of the entire mechanism.

For controlling the circuit through the lamps 34 of the signal arm, there is provided a switch 80, comprising the before described contact 39 of heel block 26 and a cooperating spring contact 81. This spring contact 81 is in the nature of a bent leaf spring curved to substantially conform to the arc of a circle that is slightly eccentric to the pivot 41 of the signal arm. The contact 39 is disengaged from the spring contact 81 when the signal arm is fully retracted, but engages the spring contact 81 when the signal arm is partially extended, and thereafter maintains frictional wiping engagement with the spring contact during the balance of the outward projecting movements of the signal arm and keeps the circuits of the lights closed during the interval the signal arm is in operative position. The circuit of the light bulbs will be completed in connection with the description of the operation.

The solenoid 45, which serves as the signal arm projecting solenoid, is like the solenoids of our co-pending application above referred to in that it is formed of two independent windings; one being a heavy wire winding 82 and the other being a relatively fine wire winding 83. The relatively heavy and relatively fine windings, 82 and 83, respectively, may otherwise be termed relatively low resistance and relatively high resistance windings, respectively. At their inner extremities, the coils 82 and 83 of solenoid 45, are connected together and to contact 84 of a normally closed switch comprising contact 84 and a cooperative contact 85, the latter of which contacts is connected to one pole of the vehicle's storage battery, indicated by B, through metallic parts of the vehicle, as shown in the diagram. The switch contact 84 is a fixed contact that is carried by the sleeve 48 and grounded to the metallic parts of the signal and associated vehicle therethrough, and the switch contact 85 is a spring contact that is carried by the head 86 of solenoid 45.

This head 86 should be understood is of insulating material and therefore it will be seen that the contact 85 is insulated from metallic parts of the signal and vehicle. The normally closed switch contacts 84 and 85 are opened automatically when the signal arm reaches a substantially fully projected position by engagement of the signal arm actuating link 59 with the spring contact 85, (see particularly Fig. 5).

Figure 10:
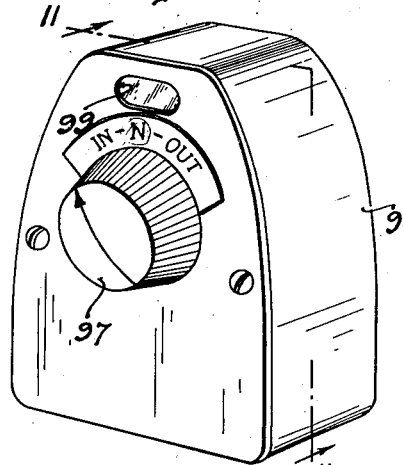
Fig. 10 is a perspective view of the control switch houses.
Figure 11:
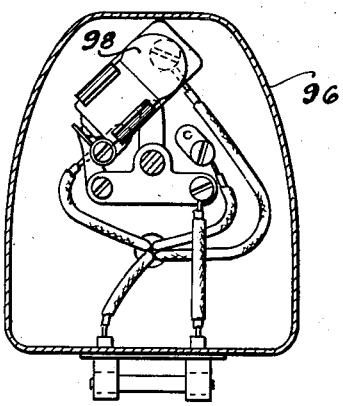
Fig. 11 is a sectional view taken on the line 11—11 of Fig. 10.

The solenoid 46, which serves as the signal arm closing solenoid, is made up of a single winding 87. One end of this solenoid is connected to one terminal of the battery through ground, as indicated in the drawings, and the other end thereof is connected directly to a contact 88 of a switch made up of said contact and a cooperating contact 89. The contact 88 is a fixed contact which is insulated from ground by an insulating block 90, and the contact 89 is a spring contact subject to its own spring tension to engage contact 88, and is insulated from ground through the medium of the insulating block 90. The spring contact 89 is engaged and moved out of engagement with its co-operating contact when the signal arm reaches a retracted position by a finger 91 that is carried by the heel block of the signal arm. This switch automatically breaks the circuit of solenoid 46 after it has completed its function of closing or retracting the signal arm. For controlling operation of the signal arm, there is provided a control switch 92 that is made up of fixed contacts 93 and 94, and a co-operating rotatively movable contact arm 95. Switch 92 is shown only diagrammatically, but may be assumed to be contained within a control box 96, shown in Fig. 10, and it may be further assumed that the axis of the switch arm 95 projects through the front face of the casing 96 and is controlled by an operating knob 97. The control box 96, preferably located within convenient reach of the operator of the vehicle, has mounted therein a pilot light bulb 98 that is visible to the operator through a sight opening 99 in the face of the control box.

For automatically controlling the circuit of the pilot light, there is provided a switch 100 which is made up of a movable grounded contact 101 and a fixed contact 102 that is carried by the non-conductive head 86 of solenoid 45. The movable contact 101 is formed as part of a slide bar 103 that is carried by the sleeve 48 for limited sliding movements in respect thereto axially of the sleeve. For securing the slide bar to, and for limited sliding movements thereof in respect to, the sleeve 48, the sleeve is provided with pins 104 that work through slots 105 in the slide bar 103. Applying over the slide bar and held in place by the pins 104, which project therethrough and are swedged outwardly thereof, is a retaining clip 106 which exerts sufficient pressure on the slide bar to prevent accidental shifting thereof. The slide bar 103 is formed at its opposite ends with projecting lugs 107, which are engaged by a pin 108, that is carried by the signal arm operating link adjacent to the point of pivotal connection 52 to the armature, near the extremes of movement of the armature. By reference, particularly to Fig. 5, it will be noted that one of the lugs 107 of the slide bar is engaged by the pin 108 when the signal arm is extended and the said slide bar has been moved to a position wherein the contacts 101 and 102 are closed. By further reference to said figure, it will be apparent that when the signal arm approaches a maximum closed or retracted position, the pin 108 will engage the lug 107 at the left, in respect to Fig. 5, and during the balance of the retracting movement of the signal arm the slide bar 103 will be moved with the pin 108 to an extent sufficient to open contacts 101 and 102 by the time the signal arm is fully retracted. By means of this switch mechanism 100, the pilot light which serves the purpose of indicating to the driver or operator when the signal arm is in operative position, will not be illuminated until the signal arm has been nearly fully extended. This is an important improvement over the pilot light arrangement of our previously identified co-pending application. Since in the device of the previous application, the pilot light circuit was closed automatically throughout the major portion of the projecting cycle of the signal arm and would indicate to the driver that the signal was in a fully projected operative position, even though it may have become stalled in some partially projected position wherein it was not truly effective as a turn indicator.

*Operation*

Figure 12:
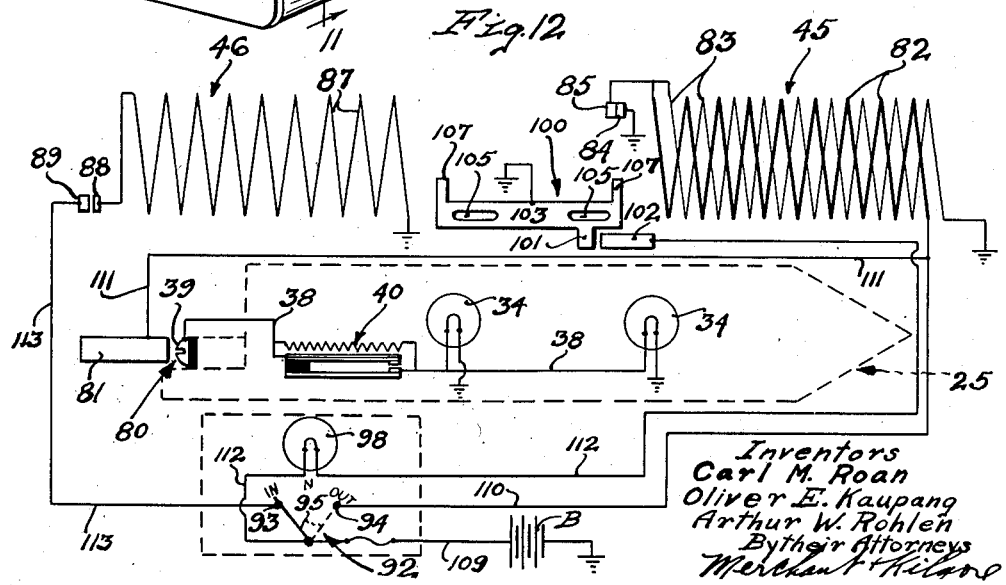
Fig. 12 is a diagrammatic view illustrating the electrical hook-up of the apparatus.

When the signalling device is in inoperative condition, that is, with the arm retracted, the parts of the signalling device will be positioned as indicated in Figs. 2, 4, 6, 7, 8 and 9, and the control switch arm 95 will be positioned in engagement with contact 93, as shown best in Fig. 12. Now, if it is desired to indicate a contemplated turn, the operator will move the switch arm 95 of the manual control switch into engagement with its cooperating contact 94, and this setting of the switch will close a circuit from battery B through only the heavy winding 82 of solenoid 45 and comprising a lead 109, the switch arm 95, contact 94, lead 110, the solenoid winding 82, closed switch contacts 84 and 85, and the metallic parts of the signal and vehicle back to the battery. The solenoid 45 will now be energized and the initial effect of such energization will be to set up a magnetic field which will magnetize the armature bar 47 and causing the latter, (see particularly Fig. 7) to draw the armature tip, which was previously spaced therefrom, (as shown in Fig. 7) into contact therewith. This movement of the armature tip 73 causes retraction of the head end of the latch 67 and disengagement of the tip end of the latch from the cooperating latch lug 71 of the signal arm, thereby automatically releasing the latch so that it is free to swing into projected position by immediate subsequent movement of the armature bar 47. It will here be understood that there will be quite a heavy current flow through the heavy winding 82 of solenoid 45 under the conditions just described, and as a result thereof a powerful magnetic field is set up which will cause the armature to move the signal arm to extended position, immediately upon release of the latch, through the medium of its operating link 50. Immediately prior to the signal arm's reaching a fully projected position, the switch contact 85 will be engaged by the signal arm operating link 50, (see particularly Fig. 5) and will open the switch contacts 84 and 85, thereby disconnecting the joined ends of windings 82 and 83 of solenoid 45 from ground. With this accomplished, the low resistance solenoid winding 82 will be connected to the grounded side of the battery B through the medium of the high resistance winding 83 of said solenoid 45, which latter winding is grounded at its end opposite that end joined to the winding 82. The circuit, now closed through serially connected windings 82 and 83, constitutes what may be termed a holding circuit, there being now a greatly reduced current flow through the solenoid 45, and although there is a proportionate reduction in power-producing effect on the armature 47, the pressure exerted by the armature on the signal arm will nevertheless be sufficient to maintain the signal arm in projected condition.

Under initial projecting movements of the signal arm the switch contact 80 will be closed with switch contact 81, and will remain engaged with said contact while the signal arm is projected and this closing of switch contacts 80 and 81 will complete a circuit through pilot lights 34 of the switch arm, which comprises lead 109, control switch contacts 94 and 95, lead 110, a lead 111, contacts 80 and 81, lead 38 inclusive of flash circuit-maker 40 and ground. Also, it will be noted that when the signal arm reaches a substantially fully projected position, the switch 100 will be closed, thereby completing a circuit for the pilot light 98 comprising of lead 109, a lead 112 having the pilot light 98 interposed therein, contacts 101 and 102 of switch 100 and ground. Hence, in an extended position, the signal arm lights 34 will be illuminated and the pilot light 98 will be illuminated, the latter indicating to the operator that the signal arm is in a fully extended operative position.

Due to the small amount of current drawn by the serially connected windings of solenoid 45, the signal arm may be left in extended position for quite long intervals without draining the battery to a serious extent. When the operator desires to retract the signal arm, he merely moves the control switch arm 95 into engagement with contact 93, thereby opening the circuit through the serially connected windings of solenoid 45 and closing a circuit through solenoid 46, comprising lead 109, switch arm 95, its cooperating contact 93, a lead 113 now closed, switch contacts 88 and 89, solenoid winding 87 and ground.

As a result of energization of solenoid 46, a magnetic field will be set up which will draw the armature 47 in to the right of respective Fig. 5, thereby retracting the signal arm to its normal position within the casing 20. Near the completion of this retracting movement switch 100 will be opened, thereby opening the circuit of the pilot light, switch contacts 80 and 81 will be open, thereby breaking the circuit of the signal arm lights 34, and switch contacts 88 and 89 will be opened, thereby automatically breaking the circuit through solenoid 46. With the several circuits thus automatically opened upon retraction of the signal arm the operator need pay no further attention to the control switch 92 until such time as he again has occasion to indicate a turn.

As previously stated, the latch mechanism, which becomes automatically set upon retraction of the signal arm, will hold the signal arm locked against accidental projection under all ordinarily encountered conditions, but should the latch 67 become released and the signal arm be moved slightly toward extended position, as a result of an excessive bump or jolt, the switch contacts 88 and 89 will be automaticaly closed in response to such very slight projecting movement of the signal arm, thereby closing the circuit through solenoid 46 and rendering said solenoid operative to retract the signal arm and re-set the latch.

The above described automatic opening of the several circuits, upon retracting and latching of the signal arm, is an important improvement over the arrangement of our previously filed and above identified co-pending application wherein the circuit of the signal arm returning solenoid remained closed until broken through the medium of the manual control switch. One of the important advantages of the present arrangement over the said prior arrangement is that in the latter arrangement the operator has only two operations of the manual control switch to think about, whereas in the previous arrangement he was called upon to operate the manual control switch three times for each turn indication. In other words, in either the prior or present arrangements the operator must operate the manual control switch once to project the signal and a second time to retract the signal arm, but the important difference is that in the present arrangement the operator after positioning the manual control switch for signal arm retraction, is relieved of further consideration of the mechanism until he desires to indicate another turn, whereas with the prior arrangement it was necessary for the operator to re-position the manual control switch after the signal arm had been retracted, to break the circuit of the signal arm retracting solenoid and thereby relieve the vehicle's battery of further drain and prevent overheating of the returning solenoid.

Another important advantage of the present arrangement over that of the arrangement of our previously filed co-pending application above referred to is the use of a latch mechanism in the present instance that is not so positive in its action but what it can be over-come by not very great manual pressure exerted directly on the signal arm. The importance of this feature lies firstly in the fact that it permits elimination of any and all connections, such for example, as those employed in the arrangement of our co-pending application, for effecting manual release of the latch, and secondly lies in the fact that such latch mechanism is not as likely to become accidentally stuck as such non-positive locking or latching mechanism. The latter feature being due to the fact that signal arm projecting pressure will, if necessary, aid in releasing the latch. Obviously, of course, the use of a non-positive latching mechanism, such as described in connection with the present application, is practical only when used in conjunction with means such as herein employed for automatically retracting the signal arm and re-setting the latch should the latch accidentally release the signal arm as a result of excessive jarring. The present arrangement, the switch arm 95 of the master control switch 92, is preferably never set in a position intermediate the contacts 93 and 94 except for the purpose of changing light bulbs 34 in the signal arm which, of course, must be done when the signal arm is extended.

What we claim is:

1. In a device of the kind described, a casing, a signal arm retractable into and projectable from the casing, a reversible electric motor means for projecting and retracting the signal arm, said motor being substantially ineffective to prevent movement of the signal arm when it is de-energized, circuits for said reversible motor, a remotely located control switch operative in one position to close the one of said circuits that causes operation of the reversible motor in a direction to extend the signal arm and in another position to close the one of said circuits that operates the motor in a direction to move the signal arm from extended to retracted position, and automatic switch means associated with the signal arm retracting circuit and operative to automatically break said circuit when the signal arm reaches a substantially retracted position, and to automatically momentarily close the last named circuits when and if the signal arm should become accidentally partially extended from a retracted position during a time when the reversible motor means is de-energized.

2. The structure defined in claim 1 in further combination with means for automatically latching the signal arm in retracted position, said latch means being yieldable to undue projecting pressure on the signal arm.

3. The structure defined in claim 1 in further combination with means for automatically latching the signal arm in retracted position, said latch means being yieldable to undue projecting pressure on the signal arm, and means for automatically retracting the latch when the reversible motor is rendered operative to project the signal arm.

4. The structure defined in claim 1 in further combination with means for automatically latching the signal arm in retracted position and means for automatically retracting the latch when the reversible motor is rendered operative to project the signal arm.

5. In a device of the kind described, a signal casing, a signal arm secured to said casing for projecting movements therefrom and retracting movements thereinto, reversible motor means for extending and retracting the signal arm, a source of motivating energy for said reversible motor, manually operative control means for selectively rendering said motor operative to move in opposite directions or render the same inoperative, said reversible motor means, when de-energized, being substantially ineffective on the said signal arm to move or retard movements of the signal arm, and automatic control means for automatically de-energizing the motor when the signal arm has been retracted as a result of energization of the motor through manipulation of the manual control means, said automatic control means also being operative to automatically energize the motor to produce signal arm closing movements and automatically retract the signal arm to normal position within the casing when and if the signal arm becomes accidentally partially extended from the casing, during a time when the manual control means is set in signal arm retracting position and the reversible motor is de-energized.

6. In a device of the kind described, a casing, a signal arm mounted for retracting movements into and projecting movements from the casing, reversible motor means for extending and retracting the signal arm, a source of energy for said motor, manually operative control means for rendering said motor operative in opposite directions, said reversible motor being, when de-energized, substantially ineffective on the signal arm to retard movements thereof, yielding latch means for normally locking the signal arm in retracted position and against accidental movements from the casing, means for automatically releasing the latch when said motor is rendered operative through manual control to extend the signal arm, and automatic control means for said motor, said automatic control means being operative to automatically de-energize and render the motor inoperative when the signal arm reaches a retracted position within the casing as a result of manual control and being operative when and if the latch should accidentally release the signal arm from the casing during a time when the reversible motor is deenergized and permit accidental partial extension of the signal arm to automatically render the motor operative to retract the signal arm and re-set the latch and thereafter again de-energize the motor and render the same inoperative.

7. In a device of the kind described, a signal casing, a signal arm secured to the casing for projecting movements therefrom and retracting movements thereinto; a reversible motor of the type comprising axially spaced solenoids, an armature bar common to said spaced solenoids and adapted to be moved longitudinally in one direction under energization of one of the solenoids and in the opposite direction under energization of the other of said solenoids, and linkage operatively connecting said armature bar to the signal arm; a source of potential for said solenoids, manually operative control means for selectively controlling energization and de-energization of said solenoids from said source of potential, and automatic control means operative to cause automatic de-energization of the signal arm closing solenoid when the signal arm has been retracted as a result of energization thereof and to automatically cause energization of the signal arm retracting solenoid when and if the signal arm should be accidentally partially extended from the casing during a time when both of said solenoids are de-energized.

CARL M. ROAN.
OLIVER E. KAUPANG.
ARTHUR W. ROHLEN.